(No Model.)

P. NIES.
ICE PICK AND BREAKER.

No. 285,060. Patented Sept. 18, 1883.

Attest.
Ora Converse
M. M. Converse

Inventor.
Phillip Nies.
B. C. Converse,
Atty.

UNITED STATES PATENT OFFICE.

PHILLIP NIES, OF NEWARK, OHIO, ASSIGNOR OF TWO-THIRDS TO JOHN SCHLEGEL AND JOHN ERBE, BOTH OF SAME PLACE.

ICE PICK AND BREAKER.

SPECIFICATION forming part of Letters Patent No. 285,060, dated September 18, 1883.

Application filed August 3, 1883. (No model.)

*To all whom it may concern:*

Be it known that I, PHILLIP NIES, a citizen of the United States of America, residing at Newark, in the county of Licking and State of Ohio, have invented certain new and useful Improvements in Ice Picks and Breakers, of which the following is a specification, reference being had therein to the accompanying drawings.

My invention relates to improvements in ice-picks.

My invention relates to that class of ice-picks which have a knob-handle or head, and which are used to reduce pieces of ice to small fragments by breaking it with the knob end.

The object of my invention is to relieve the hand from the jar and shock to which it is subjected by the use of ordinary ice-picks; also to combine with the ice pick and breaker an elastic spring, by which it shall be better adapted for the purpose required.

My invention consists in constructing a combined ice pick and breaker with a spiral spring intermediate between the handle and the knob or breaker of the same, said spring forming the shaft entire, which connects the knob and the handle parts.

Figure 1:
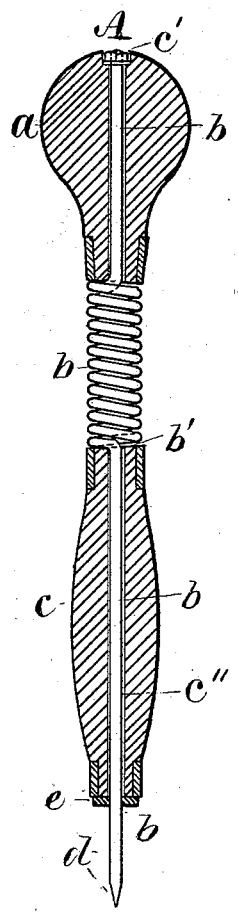
Figure 2:
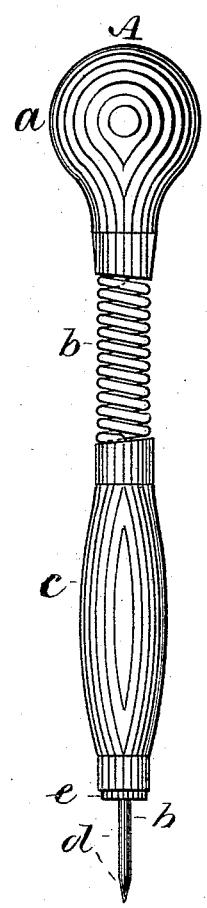

Figure 1 is a vertical longitudinal section of my improved ice pick and breaker. Fig. 2 is a side elevation of the same.

A is the ice pick and breaker.

*a* is the knob on the top end, by which the ice is reduced to small fragments when it is used as a breaker, the piece to be broken up being held in one hand and the handle *c* grasped with the other hand, and the instrument used like a mallet.

A rod, *b*, which extends straight through the central longitudinal hole, $c^2$, in *a* and through hole $c''$ in the handle *c*, which is also in the central longitudinal line of the latter, has its entire middle portion between the knob and handle parts coiled into a strong spiral spring, which forms the connecting-shaft of the tool, and which latter is thereby rendered much better adapted for the purpose of breaking the ice into small fragments in the manner described, as the elasticity of the spiral spring causes a quick rebound of the breaker and prevents any shock or injury to the hand by the force of the blows. The rod *b* of which the spring is formed is continued straight through the handle *c* far enough to have its lower end formed into a pick, being pointed at the end *d*. A collar, *e*, secured to the rod below the handle *c*, prevents the latter from coming off. That part of rod *b* above the spring extends through the center of knob *a*, and is secured at the top end by a nut, *c'*, a recess being turned in the knob at the top to receive the nut.

In constructing my improved ice pick and breaker I first form the spiral upon the middle of the rod *b*, which latter is of steel, and pointed for the pick at one end. The knob *a* is then slipped on the upper end and secured by the nut *c'*, as before stated, and the handle *c*, having a similar central longitudinal hole therein, is slipped over the lower section of the rod, and is securely fastened by the collar *e*, which can be soldered to the rod, or a thimble with a closed end can be used, and soldered to the rod as an equivalent for the same.

I claim as my invention—

1. An ice-pick having the middle or shaft portion of the same formed of a spiral spring, said spring connecting the breaker and handle portion of the same, substantially as and for the purpose set forth.

2. In an ice pick and breaker, the combination, with a steel rod pointed at one end to adapt it to be used as a pick, and having a spiral-spring coil in the middle of the same, of the knob or breaker upon the upper section of said rod and the handle for the same upon the lower section, said rod extending through both knob and handle and secured thereto, substantially as and for the purpose set forth.

3. The combination, with rod *b*, having its middle section formed into a spiral spring and its lower end, *d*, pointed, to be used as a pick, of the knob *a* and the handle *c*, the latter being secured upon the lower section of the rod by a collar, *e*, substantially as set forth.

In testimony whereof I affix my signature in presence of two witnesses.

PHILLIP NIES.

Witnesses:
THOMAS W. PHILIPPS,
CHAS. W. BEALL.